Oct. 1, 1940.        W. A. RAY        2,216,281
FAN CONTROL SYSTEM
Filed July 19, 1938        3 Sheets-Sheet 1
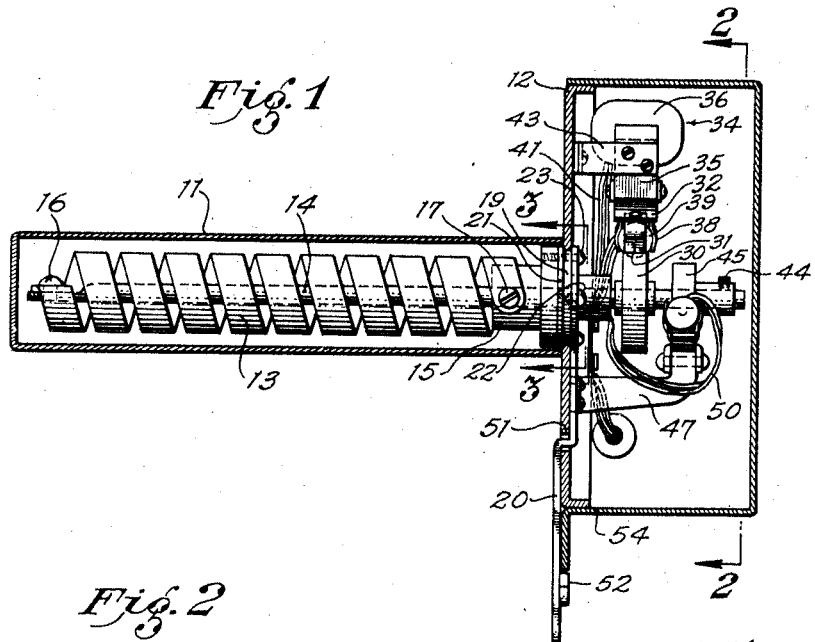
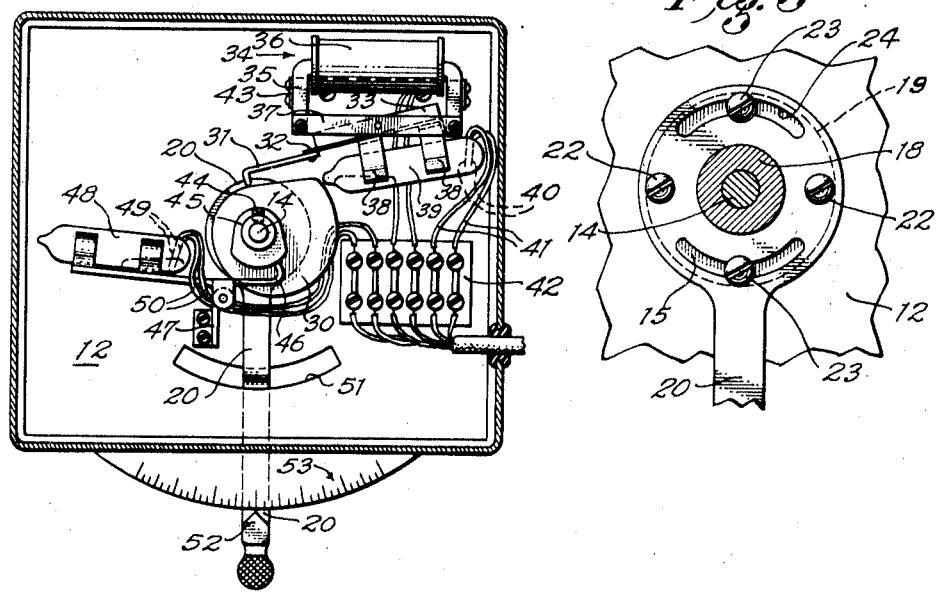
WILLIAM A. RAY,
INVENTOR.
BY    John H. Rouse
ATTORNEY

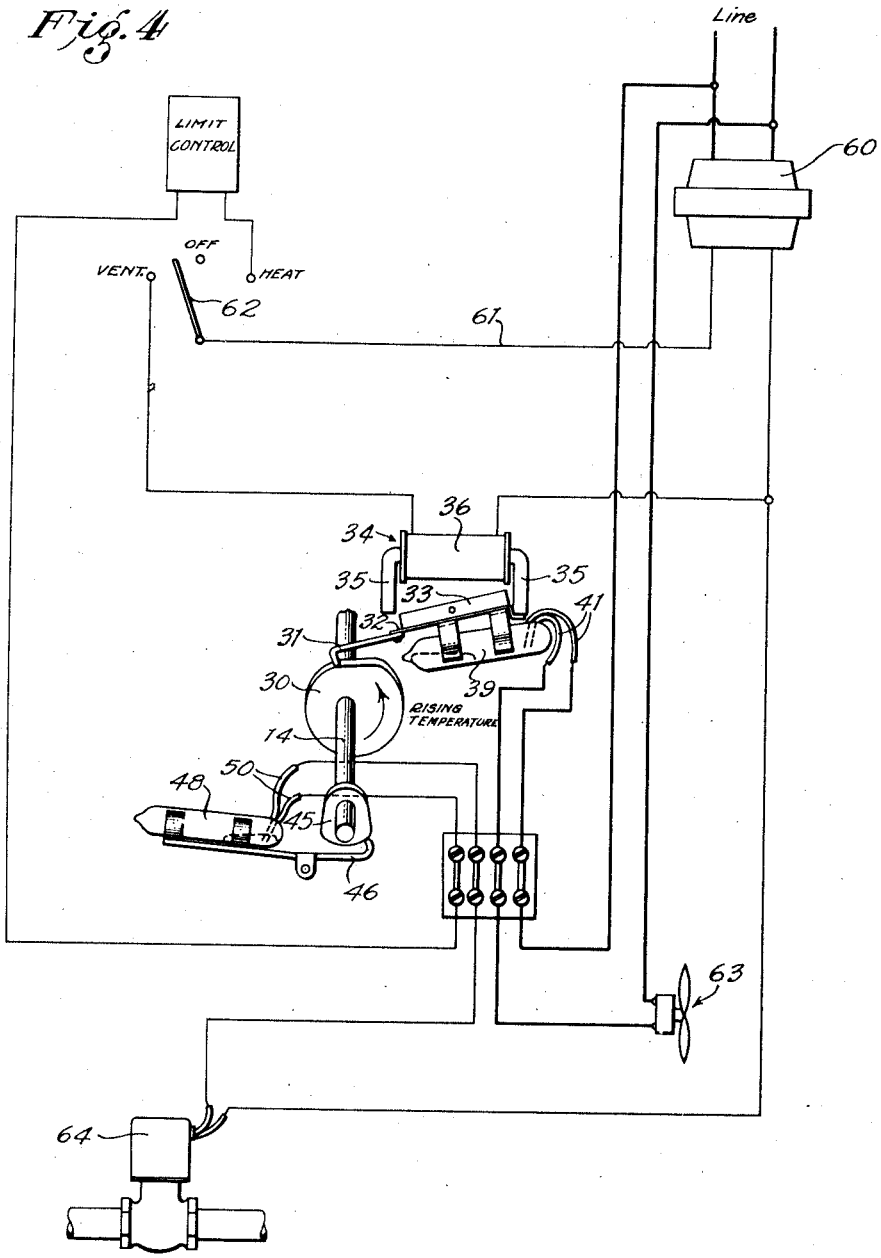

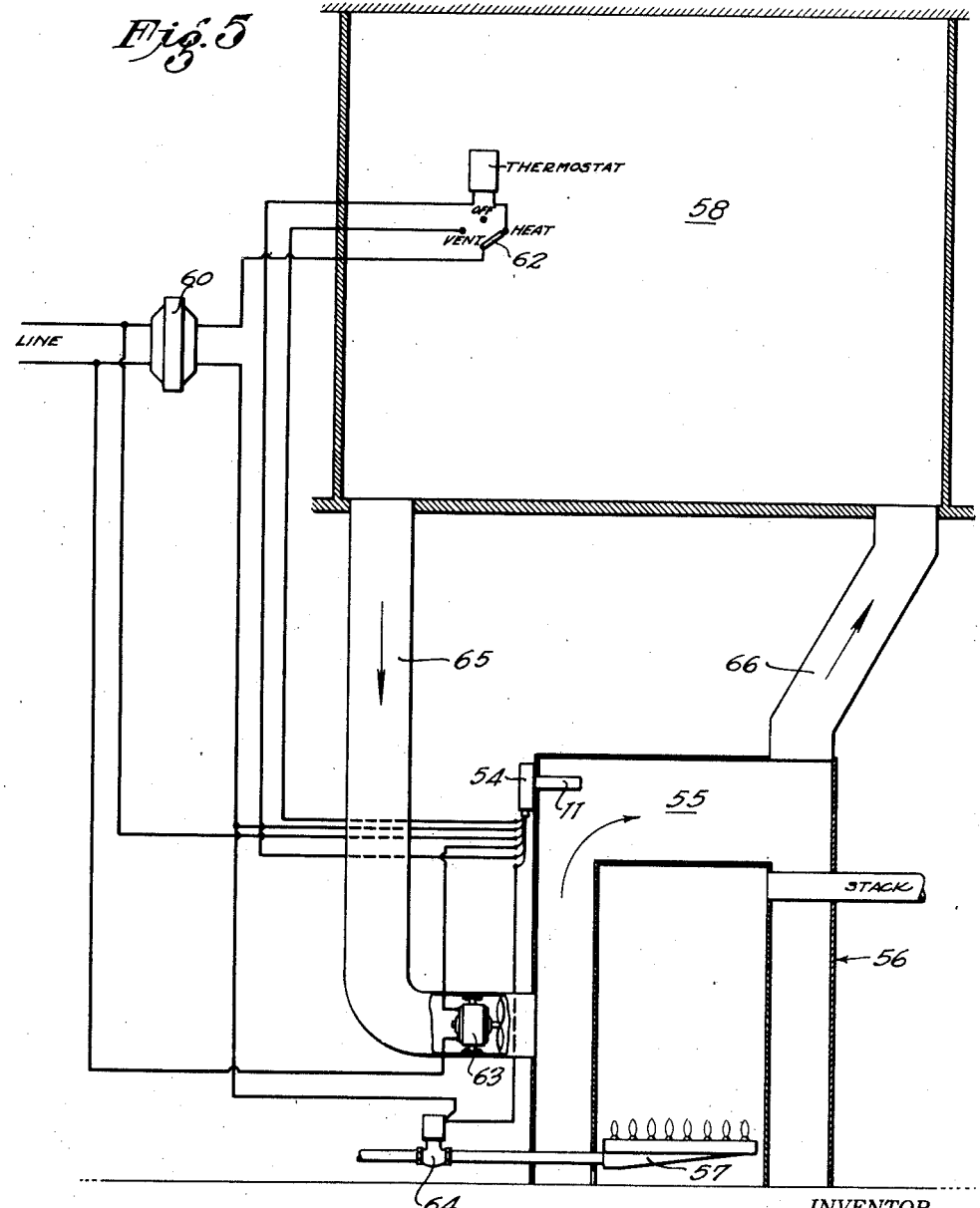

Patented Oct. 1, 1940

2,216,281

UNITED STATES PATENT OFFICE 2,216,281

FAN CONTROL SYSTEM

William A. Ray, Glendale, Calif.

Application July 19, 1938, Serial No. 219,979

5 Claims. (Cl. 126—110)

My present invention relates to control devices and has particular utility in connection with the control of condition changing systems.

A particular object of my invention is the provision of a control system for controlling a heating and ventilating system employing heated or cool air which is distributed to a space to be conditioned by air circulating means such as a blower or fan.

A further object of my invention is the provision of a novel control device actuatable by either electromagnetic or mechanical means.

Other objects and advantages of my invention will be found in the description, the drawings and the appended claims.

For a more complete understanding of the invention, reference may be had to the following detailed description and accompanying drawings, in which Figure 1 is a longitudinal sectional view of a control device embodying my invention;

Figure 2 is a section taken on the line 2—2 of Fig. 1;

Figure 3 is an enlarged, fragmentary section taken on the line 3—3 of Fig. 1; and Figures 4 and 5 are diagrammatic views of a control system embodying my invention.

Referring more particularly to the drawings, the numeral 11 denotes a tubular member, closed at one end and secured at its other end to the mounting plate 12, and enclosing the coiled bimetallic member 13. One end portion of the member 13 is secured to the shaft 14 and the other end portion to the collar 15 as by the screws 16 and 17 respectively. Freely supporting the shaft 14 is the bearing member 18 having a flange 19 which in turn is supported in an annular opening in the plate 12 by the hub of the adjusting lever 20 and the disk 21 arranged on either side of, and extending beyond, the annular opening. The screws 22 serve to secure the members 19, 20 and 21 rigidly together to form an assembly to which the collar 15 is secured by the screws 23 passing through the slots 24 in the members 19, 20 and 21, which permits rotational adjustment of the collar 15 with respect to the assembly. It will be seen that the shaft 14 is supported to rotate in the bearing member 18 and the collar 15 which, together with the members 19, 20 and 21, form a complete assembly supported in the annular opening in the plate 12. The thickness of the flange 19 is so arranged that the whole bearing assembly is frictionally held to the plate 12 but is rotatable therein by movement of the lever 20 to permit adjustment of the bimetallic member.

Secured to the shaft 14 is the cam 30 cooperable with the cam follower 31 secured to the stop member 32 of non-magnetic material, which in turn is secured to the armature 33 of an electromagnetic device, generally indicated by 34, and which comprises the core 35, the coil 36 and the bracket 37 in which the armature is pivotally supported. Secured to the armature 33, as by the clips 38, is the mercury tube switch 39 having contact elements 40 which are connected by the flexible leads 41 to a terminal block 42. The device 34 is secured to the plate 12 by the supporting bracket 43. The armature 33 is biased to the position shown by the weight of the cam follower 31 and is limited in its movement by the stop member 32.

Adjustably secured to the shaft 14, as by the set screw 44, is the "high-limit" cam 45 cooperating with the cam follower 46 which is pivotally mounted on the bracket 47 secured to the plate 12. Mounted on an extension of the cam follower 46 is the mercury tube switch 48 having contact elements 49 connected by the flexible leads 50 to the terminal block 42.

The adjusting lever 20 is bent to extend through an opening 51 in the plate 12 and is provided at its lower end with a pointer 52 cooperating with indicia 53 formed on a lower extension of the cover member 54.

In Figs. 4 and 5 I have shown the device, illustrated in Figs. 1, 2 and 3 and comprising the elements described in detail above, applied to a novel control system. The numeral 60 denotes an electrical transformer connected to source of power. The secondary of the transformer is connected by the wire 61 to a switch member 62 manually movable to alternate contact positions designated by the words "heat" and "ventilate."

In the "ventilate" position of the switch member, the transformer circuit is completed through the coil 36, energizing the electromagnetic device 34 and so moving the armature 33 to horizontal position. In this position the contact elements of the mercury tube switch 39 are bridged by the mercury in the tube, completing a circuit through the air circulating fan 63 to the "line." For the sake of clarity, in Fig. 4 the coil leads of the electromagnetic device have not been brought through the terminal block.

In the "heat" position of the switch member 62, the electromagnetic device 34 is disconnected from the transformer and the current may now flow through the limit control, the mercury tube switch 48 and the fuel supply control valve 64.

The tubular member 11 is adapted for mounting in the usual manner in the bonnet 55 of a hot air furnace 56, placing the bimetallic member 13 in heat responsive relation to the furnace. Fuel supply to the furnace burner 57 is controlled by the valve 64. The fan 63 serves to circulate air through ducts 65 and 66 between the furnace bonnet and a space or room 58 wherein the limit control or thermostat is located.

At such times as heating is desirable, the switch member 62 is moved to "heat" position. If the temperature in the room 58 is then such that the thermostat demands heat, circuit through the fuel supply control valve will be complete, as has been described above.

As the furnace now starts to heat, the bimetallic member will gradually turn the cam 30 in counterclockwise direction as is shown by the arrow in Fig. 4. At a predetermined bonnet temperature, dependent on the adjustment of the lever 20, the elevating portion of the cam 30, cooperating with the cam follower 31, will move the armature 33 to horizontal position, thereby actuating switch 39 to close the fan circuit. Hot air will now be circulated to the room, the thermostat serving to turn the fuel supply on and off responsive to the temperature thereof. The fan will continue to circulate air until the furnace bonnet temperature drops below the predetermined value. As was previously described, the collar 15 is adjustable in respect to the assembly which comprises the members 18, 19, 20 and 21. This is for the purpose of initial factory adjustment of the bimetallic members to compensate for variations therein.

Under certain conditions of weather or arrangement of the heating system, the bonnet temperature may rise to an abnormal degree. Such abnormal rise will effect further movement of the shaft 14 with the result that the high limit cam 45 will be moved to a position that will permit the mercury tube switch 48 to drop by gravity to open the fuel supply control valve circuit. It will be noted that the cam 45 is adjustable in respect to cam 30 to govern the high limit cut-out setting.

At such times as heating is not required, cool air may be circulated through the unheated furnace to the space by turning the manual switch member to "ventilate" position. The electromagnetic device then serves to actuate the fan control switch independently of the cam means employed when the heating system is in operation.

While I have shown and described preferred embodiments of my invention, I desire it to be understood that modifications may be made and that no limitations upon the invention are intended than are imposed by the scope of the appended claims.

I claim as my invention:

1. In combination, a device for heating air to be supplied to a space to be conditioned, means for circulating said air to said space, electrical switching means for controlling said air circulating means, an armature movable to directly actuate said switching means, means responsive to a condition in said air heating device for mechanically moving said armature, and electromagnetic means independent of said mechanical means for moving said armature.

2. The combination with a hot air furnace including a circulating fan system, of an element movable in response to variation in the bonnet temperature of said furnace, an armature movable by said element, switching means for connecting said fan to a source of current and actuated directly by movement of said armature, and electromagnetic means for moving said armature whereby said fan may be operated independently of said bonnet temperature responsive element.

3. The combination with a hot air furnace including a circulating fan system, of an element responsive to the bonnet temperature of said furnace, a shaft rotated by said element, a movable armature, means connected to said shaft for moving said armature, switching means for connecting said fan to a source of current and actuated directly by movement of said armature, and electromagnetic means for moving said armature whereby said fan may be operated independently of said bonnet temperature responsive element.

4. The combination with a hot air furnace including a circulating fan system, of an element responsive to the bonnet temperature of said furnace, a shaft rotated by said element, a cam secured on said shaft, an armature movable by said cam, switching means for connecting said fan to a source of current and actuated by movement of said armature, and electromagnetic means for moving said armature whereby said fan may be operated independently of said bonnet temperature responsive element.

5. In a heating and ventilating fan control system, in combination, a device for heating air to be supplied to a space to be conditioned, electrically operated fuel supply control means for said heating device, means for circulating said air to said space, electrical switching means for controlling said air circulating means, an armature movable to directly actuate said switching means, means responsive to a condition in said heating device for mechanically moving said armature, electromagnetic means independent of said mechanical means for moving said armature, and manually operable switching means for individually connecting said fuel supply control means or said electromagnetic means to a source of current.

WILLIAM A. RAY.